United States Patent
Stevens et al.

(10) Patent No.: US 9,654,579 B2
(45) Date of Patent: *May 16, 2017

(54) SCALABLE CONTENT DELIVERY NETWORK REQUEST HANDLING MECHANISM

(71) Applicant: Akamai Technologies, Inc., Cambridge, MA (US)

(72) Inventors: Matthew J. Stevens, Lexington, MA (US); Frederick R. Shotton, Piedmont, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/135,148

(22) Filed: Dec. 19, 2013

(65) Prior Publication Data
US 2014/0181268 A1    Jun. 26, 2014

Related U.S. Application Data

(60) Provisional application No. 61/740,598, filed on Dec. 21, 2012, provisional application No. 61/740,627, filed on Dec. 21, 2012.

(51) Int. Cl.
*G06F 15/16* (2006.01)
*H04L 29/08* (2006.01)

(52) U.S. Cl.
CPC .................. *H04L 67/2804* (2013.01)

(58) Field of Classification Search
CPC .................................................. H04L 67/2804
See application file for complete search history.

(56) References Cited

U.S. PATENT DOCUMENTS

| 5,845,060 A | 12/1998 | Vrba et al. |
| 6,079,032 A | 6/2000 | Peri |

(Continued)

FOREIGN PATENT DOCUMENTS

| WO | WO0106384 A1 | 1/2001 |
| WO | WO0113578 A1 | 2/2001 |
| WO | 2011143168 | 11/2011 |

OTHER PUBLICATIONS

Eranian, Linux new monitoring interface: Performance Counter for Linux, CSCADS workshop (Jul. 2009), 38 pages.

(Continued)

*Primary Examiner* — Nicholas Taylor
*Assistant Examiner* — Tania Pena-Santana (57) ABSTRACT

Described herein are improved systems, methods, and devices for delivering and managing metadata in a distributed computing platform such as a content delivery network (CDN) so as to configure content servers to handle client requests. The teachings hereof provide, among other things, scalable and configurable solutions for delivering and managing metadata, preferably by leveraging dynamically obtained control information. For example, in one embodiment, a given content server may store metadata, e.g., in a configuration file, that references dynamic, late-bound control information for use in satisfying dependencies. This dynamic control information can be requested by the CDN content server, typically from a remote host, when needed to parse and execute the metadata.

14 Claims, 7 Drawing Sheets

(56) References Cited

U.S. PATENT DOCUMENTS

| | | | |
|---|---|---|---|
| 6,108,703 A * | 8/2000 | Leighton | G06F 17/3089 |
| | | | 707/E17.119 |
| 6,405,252 B1 * | 6/2002 | Gupta | H04L 12/14 |
| | | | 370/229 |
| 6,487,637 B1 | 11/2002 | Arimilli et al. | |
| 6,961,858 B2 | 11/2005 | Fransdonk et al. | |
| 6,996,616 B1 | 2/2006 | Leighton et al. | |
| 7,111,057 B1 | 9/2006 | Sherman et al. | |
| 7,127,713 B2 | 10/2006 | Davis et al. | |
| 7,200,681 B1 | 4/2007 | Lewin et al. | |
| 7,240,100 B1 * | 7/2007 | Wein | H04L 67/1008 |
| | | | 709/214 |
| 7,260,639 B2 | 8/2007 | Afergan et al. | |
| 7,296,082 B2 | 11/2007 | Leighton et al. | |
| 7,376,716 B2 | 5/2008 | Dilley et al. | |
| 7,467,233 B2 | 12/2008 | Tsimelzon et al. | |
| 7,472,178 B2 | 12/2008 | Lisiecki et al. | |
| 7,590,739 B2 | 9/2009 | Swildens et al. | |
| 7,596,619 B1 | 9/2009 | Leighton et al. | |
| 7,600,025 B2 | 10/2009 | Lewin et al. | |
| 7,660,296 B2 | 2/2010 | Fletcher et al. | |
| 7,734,823 B2 | 6/2010 | Tsimelzon et al. | |
| 7,752,258 B2 | 7/2010 | Lewin et al. | |
| 8,166,079 B2 | 4/2012 | Lewin et al. | |
| 8,225,377 B2 | 7/2012 | Maffione et al. | |
| 8,266,305 B2 | 9/2012 | Sherman et al. | |
| 8,296,389 B2 | 10/2012 | Maegawa et al. | |
| 8,320,560 B2 | 11/2012 | Davenport et al. | |
| 8,381,110 B2 | 2/2013 | Barger et al. | |
| 8,392,912 B2 | 3/2013 | Davis et al. | |
| 8,402,525 B1 | 3/2013 | Shah et al. | |
| 8,458,769 B2 | 6/2013 | Dilley et al. | |
| 8,615,577 B2 | 12/2013 | Black et al. | |
| 8,856,263 B2 | 10/2014 | Fainberg et al. | |
| 9,002,990 B1 | 4/2015 | Anand et al. | |
| 9,009,267 B2 | 4/2015 | Sherman et al. | |
| 2001/0049741 A1 | 12/2001 | Skene et al. | |
| 2002/0010798 A1 | 1/2002 | Ben-Shaul et al. | |
| 2002/0156911 A1 | 10/2002 | Croman et al. | |
| 2003/0051100 A1 | 3/2003 | Patel et al. | |
| 2003/0135509 A1 | 7/2003 | Davis et al. | |
| 2003/0188106 A1 | 10/2003 | Cohen | |
| 2004/0010621 A1 | 1/2004 | Afergan et al. | |
| 2005/0066113 A1 | 3/2005 | Rajamony et al. | |
| 2006/0080546 A1 | 4/2006 | Brannon et al. | |
| 2007/0028068 A1 | 2/2007 | Golding et al. | |
| 2007/0043824 A1 | 2/2007 | Fremantle et al. | |
| 2007/0136337 A1 | 6/2007 | Sah et al. | |
| 2007/0136794 A1 | 6/2007 | Chin et al. | |
| 2007/0229874 A1 | 10/2007 | Hamada et al. | |
| 2008/0098093 A1 | 4/2008 | Simon et al. | |
| 2008/0126547 A1 | 5/2008 | Waldspurger et al. | |
| 2009/0132640 A1 | 5/2009 | Verma et al. | |
| 2009/0182843 A1 | 7/2009 | Hluchyj et al. | |
| 2009/0228494 A1 | 9/2009 | Beichter et al. | |
| 2009/0327303 A1 | 12/2009 | Ootjers et al. | |
| 2009/0328174 A1 | 12/2009 | Cen et al. | |
| 2010/0023582 A1 | 1/2010 | Pedersen et al. | |
| 2010/0088505 A1 | 4/2010 | Coppola et al. | |
| 2010/0138485 A1 | 6/2010 | Chow et al. | |
| 2010/0205458 A1 | 8/2010 | O'Connell, Jr. et al. | |
| 2011/0066676 A1 | 3/2011 | Kleyzit et al. | |
| 2011/0078688 A1 | 3/2011 | Zhai et al. | |
| 2011/0145386 A1 | 6/2011 | Stolorz et al. | |
| 2011/0173345 A1 | 7/2011 | Knox et al. | |
| 2011/0219109 A1 | 9/2011 | Zehavi et al. | |
| 2012/0011360 A1 | 1/2012 | Engels et al. | |
| 2012/0089700 A1 | 4/2012 | Safruti et al. | |
| 2012/0096106 A1 | 4/2012 | Blumofe et al. | |
| 2012/0151016 A1 | 6/2012 | Wein et al. | |
| 2012/0173822 A1 | 7/2012 | Testardi et al. | |
| 2012/0209942 A1 | 8/2012 | Zehavi et al. | |
| 2012/0259942 A1 * | 10/2012 | Brookins | H04L 67/28 |
| | | | 709/213 |
| 2012/0303322 A1 | 11/2012 | Rego et al. | |
| 2012/0304183 A1 | 11/2012 | Yamashita et al. | |
| 2012/0317655 A1 * | 12/2012 | Zhang | G06F 21/6218 |
| | | | 726/28 |
| 2013/0097409 A1 | 4/2013 | Yamana et al. | |
| 2013/0191499 A1 | 7/2013 | Ludin et al. | |
| 2013/0212270 A1 | 8/2013 | Hsieh et al. | |
| 2013/0246588 A1 | 9/2013 | Borowicz et al. | |
| 2013/0305057 A1 | 11/2013 | Greco et al. | |
| 2014/0040993 A1 | 2/2014 | Lorenzo et al. | |
| 2014/0149533 A1 | 5/2014 | Bergman et al. | |
| 2014/0164776 A1 | 6/2014 | Hook et al. | |
| 2015/0026315 A1 | 1/2015 | Bergman et al. | |
| 2015/0088972 A1 | 3/2015 | Brand et al. | |
| 2015/0089075 A1 | 3/2015 | Strigeus et al. | |
| 2015/0095516 A1 | 4/2015 | Bergman | |
| 2015/0100660 A1 | 4/2015 | Flack et al. | |
| 2015/0100664 A1 | 4/2015 | Flack et al. | |
| 2015/0207897 A1 | 7/2015 | Flack et al. | |
| 2015/0222642 A1 | 8/2015 | Bergman et al. | |
| 2015/0222681 A1 | 8/2015 | Basile | |
| 2015/0237131 A1 | 8/2015 | Spang et al. | |
| 2015/0356580 A1 | 12/2015 | Kobayashi | |
| 2015/0370725 A1 | 12/2015 | McMullen et al. | |
| 2016/0036765 A1 | 2/2016 | Wein et al. | |

OTHER PUBLICATIONS

Perf Wiki, Linux profiling with performance counters, last modified Feb. 20, 2013, 2 pages, available at https://perf.wiki.kernel.org/index.php/Main_Page.

Gleixner, T., Performance Counters for Linux posting, (Dec. 2008), 4 pages, available at http://article.gmane.org/gmane.linux.kernel.cross-arch/2578.

Unofficial Linux Perf Events Web-Page, undated, 2 pages, available at http://web.eece.maine.edu/~vweaver/projects/perf_events/.

WIPO International Search Report for PCT application, PCT/US2013/077298, Mar. 26, 2014, 5 pages.

WIPO Written Opinion for PCT application, PCT/US2013/077298, Mar. 26, 2014, 8 pages.

U.S. Appl. No. 14/135,158, filed Dec. 19, 2013.

U.S. Appl. No. 14/135,172, filed Dec. 19, 2013.

U.S. Appl. No. 14/135,179, filed Dec. 19, 2013.

U.S. Appl. No. 14/135,158, Non-Final Office Action mailed on Sep. 17, 2015, 19 pages.

U.S. Appl. No. 14/135,172, mailed on Nov. 3, 2015, 37 pages.

U.S. Appl. No. 14/135,179, Non-Final Office Action mailed on Dec. 30, 2015, 33 pages.

Help Guides—Fastly Documentation, web page (3 page printout), available Nov. 13, 2013, http://web.archive.org/web/20131113175514/http://docs.fastly.com/guides/21837093/21921227.

Instant Purge web page, Fastly, 2 pages, retrieved Aug. 4, 2014 from Web Archive at http://web.archive.org/web/20130927112500/http://www.fastly.com/about/why-fastly/instant-purging, Web Archive's asserted date for web page listed as Sep. 27, 2013.

Known Mechanisms for Content Internetworking, draft-douglis-cdi-known-mech-00.txt, Nov. 8, 2001.

Surrogate Keys: Part 1 blog, Fastly, 3 pages, retrieved Aug. 4, 2014 from http://www.fastly.com/blog/surrogate-keys-part-1/#.U-ALbPldV8F, blog date listed as Jul. 12, 2013.

Surrogate Keys: Part 2 blog, Fastly, 4 pages, retrieved Nov. 6, 2014 from http://www.fastly.com/blog/surrogate-keys-part-2/#.VFvUt_nF-So, blog date listed as Jul. 30, 2013.

Transcript of presentation "Addressing the Scalability Challenge of Server-Sent Events" held on Jun. 15, 2011 at Velocity 2011 Conference—O'Reilly Conferences, Jun. 14-16, 2011, Santa Clara CA, 26 pages (transcript accompanies "Scaling Server-Sent Event."

U.S. Appl. No. 14/046,884, filed Oct. 4, 2013.

U.S. Appl. No. 14/507,601, filed Oct. 6, 2014.

U.S. Appl. No. 14/507,754, filed Oct. 6, 2014.

Web Page, Configuration API—Fastly Documentation, Wayback Machine archive of Nov. 7, 2013 for web page http://web.archive.

(56) References Cited

OTHER PUBLICATIONS org/web/20131107040435/http://docs.fastly.com/api/config#purge, Purge section (pp. 29-30), 59 pages overall. (downloaded Mar. 9, 2016).
Web Page, Help Guides—Fastly Documentation, Wayback Machine archive of Dec. 9, 2013 for web page http://web.archive.org/web/20131209101736/http://docs.fastly.com/guides/21837093/23138458, 2 pages. (downloaded Mar. 9, 2016).
Web Page, How can I add Surrogate Key headers when my backend is S3? Purging Fastly Help Guides, Wayback Machine archive of May 1, 2014 for web page http://web.archive.org/web/20140501151517/http://docs.fastly.com/guides/21837093/22590268, 3 pages, (downloaded Mar. 9, 2016).
Ludin, Stephen, "Scaling Server-Sent Events (AKA Long Polling)" Slide Presentation for "Addressing the Scalability Challenge of Server-Sent Events" held on Jun. 15, 2011 at Velocity 2011 Conference—O'Reilly Conferences, Jun. 14-16, 2011, Santa Clara CA, 39 pages.
Ludin, Stephen, "Webpage excerpt describing presentation by Stephen Ludin, Addressing the Scalability Challenge of Server-Sent Events" held on Jun. 15, 2011 at Velocity 2011 Conference—O'Reilly Conferences, Jun. 14-16, 2011, Santa Clara CA, 5 pages (downloaded from http://velocityconf.com/velocity2011/public/schedule/speaker/122026).
U.S. Appl. No. 14/135,158, Final Office Action mailed on May 4, 2016, 9 pages.
Bertocci, Vittorio, "Chapter 2. Identity protocols and application types," excerpt from "Modern Authentication with Azure Active Directory for Web Applications", Publisher: Microsoft Press. ISBN: 9780735698475, Chapter 2 Excerpt, Dec. 2015, 61 pages.
Final Office Action, for U.S. Appl. No. 14/135,172, mailed Aug. 12, 2016, 52 pages.
Hardt, D., Ed., "The OAuth 2.0 Authorization Framework", RFC 6749 IETF, Oct. 2012, 76 pages.
Masse, Mark, "Rest API Design Rulebook", O'Reilly Media, see w/o limitation Chapter 2 (pp. 11-22, 'Identifier Design with URIs'), Oct. 2011.
Oasis, Security Assertion Markup Language (SAML) v2.0 Technical Overview, Committee Draft 02, available at http://docs.oasis-open.org/security/saml/Post2.0/sstc-saml-tech-overview-2.0-cd-02.pdf (retrieved May 2, 2016), Mar. 25, 2008, 51 pages.
Non-Final Office Action for U.S. Appl. No. 14/135,172, mailed on Dec. 9, 2016, 25 pages.
Office Action for U.S. Appl. No. 15/341,850 mailed on Mar. 2, 2017, 22 pages.

\* cited by examiner

SCALABLE CONTENT DELIVERY NETWORK REQUEST HANDLING MECHANISM

CROSS REFERENCE TO RELATED APPLICATIONS

This application is a non-provisional of and claims the benefit of priority of U.S. Application No. 61/740,598, filed Dec. 21, 2012, and of U.S. Application No. 61/740,627, filed Dec. 21, 2012. The contents of the each of the foregoing applications are hereby incorporated by reference.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to distributed data processing systems and to the delivery of content over computer networks.

Brief Description of the Related Art

Distributed computer systems are known in the art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content—such as web pages, streaming media and applications—on behalf of content providers, and ancillary technologies used therewith including, without limitation, DNS query handling, provisioning, data monitoring and reporting, content targeting, personalization, and business intelligence.

Figure 1:
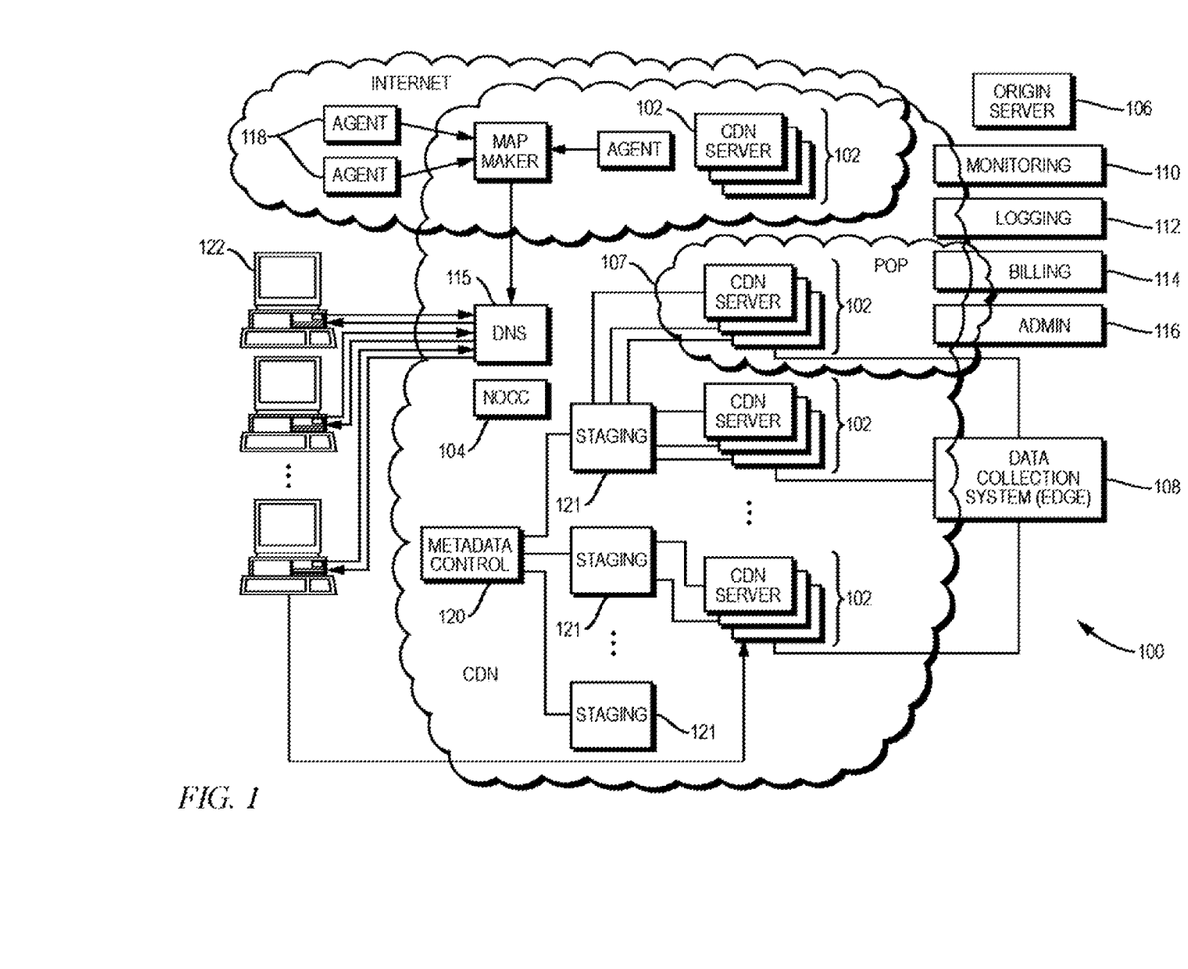
FIG. 1 is a schematic diagram illustrating one embodiment of a known distributed computer system configured as a content delivery network.

In a known system such as that shown in FIG. 1, a distributed computer system 100 is configured as a content delivery network (CDN) and is assumed to have a set of machines distributed around the Internet. Typically, most of the machines are configured as CDN content servers 102. Such machines may be located near the edge of the Internet, i.e., at or adjacent end user access networks. A network operations command center (NOCC) 104 may be used to administer and manage operations of the various machines in the system. Third party sites affiliated with content providers, such as web site hosted at origin server 106, offload delivery of content (e.g., HTML, embedded page objects, streaming media, software downloads, and the like) to the distributed computer system 100 and, in particular, to the servers 102 (which are sometimes referred to as "edge" servers in light of the possibility that they are near an "edge" of the Internet). Such servers 102 may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client machines 122 that desire such content may be directed to the distributed computer system to obtain that content more reliably and efficiently. The CDN's servers 102 respond to the client requests, for example by obtaining requested content from a local cache, from another CDN server 106, or other source.

Although not shown in detail in FIG. 1, the distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a domain name system (DNS) query handling mechanism 115, which is authoritative for content domains being managed by the CDN. A distributed data transport mechanism 120 may be used to distribute control information (e.g., metadata to manage content, to facilitate load balancing, and the like) to the servers 102.

Figure 2:
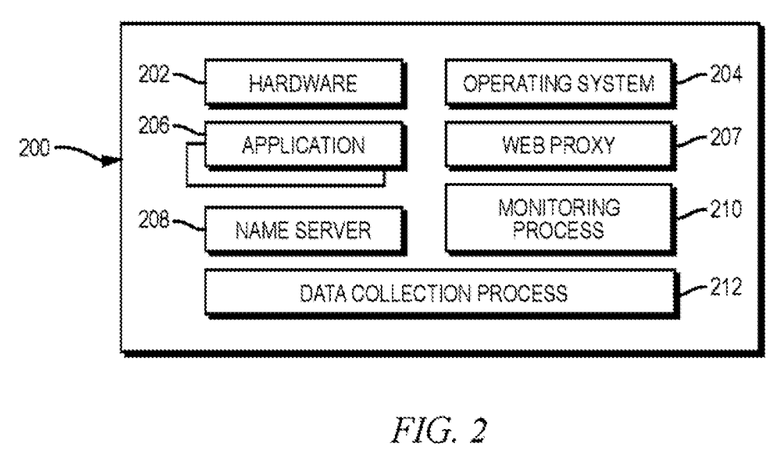
FIG. 2 is a schematic diagram illustrating one embodiment of a machine in the system of FIG. 1.

As illustrated in FIG. 2, a given machine 200 in the CDN (e.g., a given CDN server 102) comprises commodity hardware (e.g., an Intel processor) 202 running an operating system kernel (such as Linux® or variant) 204 that supports one or more applications 206. To facilitate content delivery services, for example, given machines typically run a set of applications, such as an HTTP proxy server 207, a name server 208, a local monitoring process 210, a distributed data collection process 212, and the like. The HTTP proxy 207 (sometimes referred to herein as a global host or "ghost") typically includes a manager process for managing a cache and delivery of content from the machine. For streaming media, the machine typically includes one or more media servers, such as a Windows® Media Server (WMS) or Flash® server, as required by the supported media formats.

The machine shown in FIG. 2 may be configured to provide one or more extended content delivery features, preferably on a domain-specific, content-provider-specific basis, preferably using configuration files that are distributed to the CDN servers 102 using a configuration system. A given configuration file preferably is extensible markup language (XML)-based and includes a set of content handling rules and directives that facilitate one or more advanced content handling features. The configuration file may be delivered to a CDN server 102 via the data transport mechanism 120. U.S. Pat. No. 7,240,100, the contents of which are hereby incorporated by reference, illustrate a useful infrastructure for delivering and managing CDN server content control information and this and other content server control information (referred to as "metadata") can be provisioned by the CDN service provider itself, or (via an extranet or the like) the content provider customer who operates the origin server 106.

The contents of U.S. Pat. No. 7,111,057, titled "Method and system for purging content from a content delivery network," are hereby incorporated by reference.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client browser then makes a content request (e.g., via HTTP or HTTPS) to a CDN server associated with the IP address. The request includes a host header that includes the original content provider domain or sub-domain. Upon receipt of the request with the host header, the server checks its configuration file to determine whether the content domain or sub-domain requested is actually being handled by the CDN. If so, the server applies its content handling rules and directives for that domain or sub-domain as specified in the configuration. As noted above, these content handling rules and directives may be located within an XML-based "metadata" configuration file.

As an overlay, the CDN resources may be used to facilitate wide area network (WAN) acceleration services between enterprise data centers (which may be privately managed) and third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the Internet 'cloud' (e.g., from a SaaS provider). To accomplish these two use cases, CDN software may execute on machines (potentially virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities). This type of managed solution provides an enterprise with the opportunity to take advantage of CDN technologies with respect to their company's intranet. This kind of solution extends acceleration for the enterprise to applications served anywhere on the Internet, such as SaaS (Software-As-A-Service) applications. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

As noted above, when a given content server in a CDN (or in another distributed computing platform) receives a content request, it typically needs to have information about the identity and characteristics of the requested objects, as well as information about the features of the CDN that should be invoked when delivering those objects. In short, the CDN (and by extension its constituent servers) needs to have information about how to handle a content request. Such information, referred to as "metadata," can be distributed in configuration files to the content servers, as noted above with respect to U.S. Pat. No. 7,240,100.

However, as a CDN grows and its feature set diversifies, the volume and complexity of metadata rises significantly. Moreover, the continuing move to cloud providers, platform as a service (PaaS), infrastructure as a service (IaaS), and/or software as a service (SaaS), further complicates the management of metadata for a CDN. Improved approaches for delivering and managing metadata are necessary to meet such challenges.

SUMMARY

Described herein are improved methods, devices, and systems for delivering and managing metadata in a distributed computing platform such as a content delivery network (CDN). The teachings hereof provide, among other things, scalable and configurable solutions for delivering and managing metadata, preferably by leveraging dynamically obtained control information. For example, in one embodiment, a given CDN content server may receive and store metadata (e.g., in a configuration file). The metadata can contain references to dynamic, late-bound control information for use in satisfying dependencies in the metadata. This dynamic control information is preferably requested by the CDN content server when needed to parse and execute the metadata, and in many cases (though without limitation) from a remote host at the time of the client request for an object. The dynamic control information may be parameters, e.g., an input to a function in the metadata configuration file. The dynamic control information may be functions or logic. In this way the dynamic control information represents a layer of abstraction within the metadata configuration file. The retrieved dynamic control information may be cached locally for use in handling subsequent requests. A variety of further details, uses and alternatives are described in this document.

By way of further illustration, in an embodiment, an apparatus can comprise a content delivery network (CDN) server that has circuitry forming one or more processors and memory holding instructions to be executed by the one or more processors. The execution of the instructions can cause the CDN server to receive a request for particular content from a client, the request including a host header; determine that a string in the host header is associated with a content control within a set of content controls stored at the CDN server. The content control has at least one dependency. The CDN server can send a request to a remote host for control information that will satisfy the dependency; receive the control information; and satisfy the at least one dependency with the control information. Further, the CDN server can apply the content control prior to serving a response to the request.

In some cases, the executed instructions can cause the CDN server to cache the control information at the CDN server for use with subsequent requests for the particular content, and/or to send a content realm identifier (e.g., extracted from the client request) to the remote host with the request for control information. The content realm identifier can correspond, for example, to a given cloud-customer of the cloud-provider, the cloud-provider being a customer of the CDN and providing a service that is at least one of: infrastructure as a service, platform as a service, software as a service.

In some cases, the content control can include a function that takes at least one parameter as an input, and the control information includes the at least one parameter, and/or determines whether the particular content is valid to serve to the client from a cache at the CDN server. The content control may be in a markup language file, in some cases.

In another embodiment, a system can have a content delivery network (CDN) server that has circuitry forming one or more processors and memory holding instructions to be executed by the one or more processors to cause the CDN server to receive a request for particular content from a client, the request including a host header; determine that a string in the host header is associated with a content control within a set of content controls stored at the CDN server, where the content control has at least one dependency; send a request to a remote host for control information that will satisfy the dependency, the request including one or more pieces of data derived from the request; receive the control information; satisfy the at least one dependency with the control information; and apply the content control prior to serving a response to the request.

The system can also have a remote host for the control information that includes circuitry forming one or more processors and memory holding instructions to be executed by the one or more processors to cause the remote host to: receive the request for the control information from the CDN server; retrieve a control file associated with the control information; execute logic embedded in the control file, the logic taking the one or more pieces of data as parameters and returning control information; and send the control information to the CDN server.

The subject matter described herein has a wide variety of applications in content delivery and online platform architectures.

As those skilled in the art will recognize, the foregoing description merely refers to certain examples of the invention for overview purposes. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The teachings hereof will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be within the scope of the present invention. All patents, publications and references cited herein are expressly incorporated herein by reference in their entirety. Throughout this disclosure, the term 'e.g.' is used as an abbreviation for the non-limiting phrase 'for example'.

Introduction

Content delivery can be provided by directing client requests for content (e.g., objects such as markup language files, images, scripts, CSS, streaming media, and the like) to the content delivery network—or more particularly, to one of the CDN's constituent servers. When the CDN receives client requests for content, it typically needs to have information about the identity and characteristics of the requested objects, as well as information about the features of the CDN platform that should be invoked when delivering those objects. In short, the CDN (and by extension its constituent servers) needs to have information about how to handle a content request.

This information is referred to herein to as "metadata." Metadata may include data about the content provider's objects, and more generally may include the set of all control options and parameters that determine how a given CDN server will handle a request for an object (be it an HTML file, images, CSS, scripts, streaming media, or other digital content). For example, a given object may have metadata associated with it that reflects such things as:

CP Code—an internal tracking number, primarily used for billing;

Origin Server—the location of the original copy of the object which a CDN server may need to fetch or revalidate the object (e.g., a content provider's server or NetStorage);

Coherence information—information such as a time-to-live (TTL) indicating how long CDN servers should cache the object before going to the origin server; this maintains the object's freshness.

Metadata may also specify that certain features of the CDN should be invoked when handling the request, and how to do so. These features may range from the use of certain routing technologies or cache-hierarchy-parent, to the modification of the content before serving it (e.g., particular web content optimizations or device-specific adaptations), to the selective invocation of redirect responses, to the application of certain security procedures (e.g., a web application firewall) to content posted from the client. These are merely examples.

As a CDN grows and its feature set diversifies, the volume and complexity of metadata rises significantly. Moreover, the continuing move to cloud providers, such as providers of platform as a service (PaaS), infrastructure as a service (IaaS), and/or software as a service (SaaS), further complicates the management of metadata for a CDN.

For example, a CDN may have as a customer a cloud-provider who is offering a cloud-based service to its own cloud-customers (or in other words, to the 'cloud-users'). For purposes of illustration, assume the cloud-based service enables each cloud-customer to host their websites on the cloud-provider platform. The cloud-provider then works with the CDN to have the CDN actually deliver the content from the hosting platform. From the CDN's perspective there is one direct customer relationship with the cloud-provider. However, that cloud-provider may want to have the ability to independently configure at least some or potentially all of its direct cloud-customer sites, be it for internal operational purposes or to be able to pass on a level of customization to its cloud-customers.

As an illustration, consider a cloud-provider who is a SaaS and offers a web application to its cloud-customers. The SaaS provider may want to configure its web application differently for each cloud-customer, again with the content being delivered by the CDN on behalf of the SaaS provider.

Consider further the case of a more traditional content-provider as described previously, but who desires dozens, hundreds, or even thousands of unique websites or other digital properties due the scale of their online operations. A single configuration will likely not suffice—as there will likely be a need for many different configurations for this one content-provider customer of the CDN.

With the foregoing by way of introduction, described below are embodiments of improved metadata systems and methods that address these and similar issues, and provide other functionality as will become clearer below.

Example Infrastructure

Figure 3:
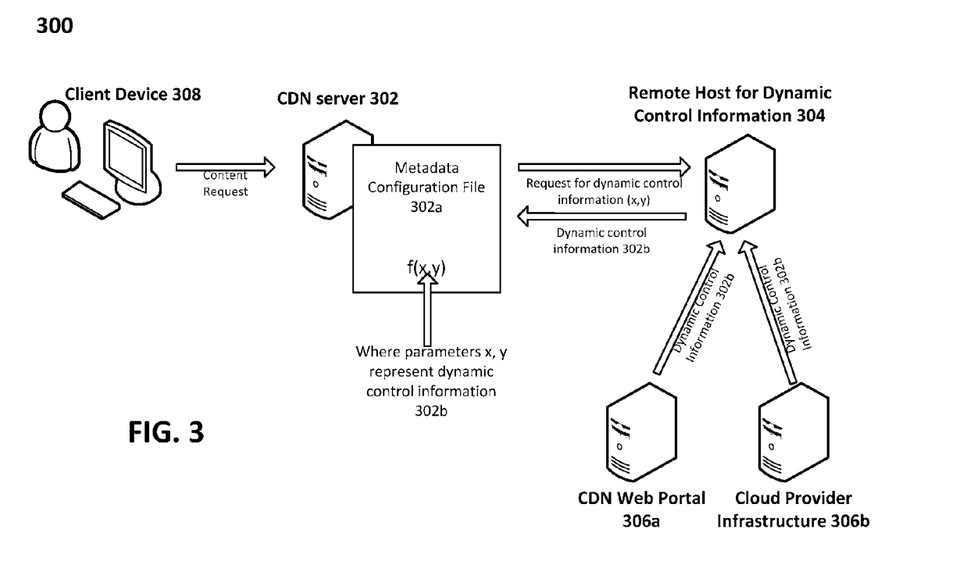
FIG. 3 is a schematic diagram illustrating one embodiment of an architecture for communicating metadata control information.

FIG. 3 illustrates one embodiment of a metadata infrastructure. Assume—for illustrative purposes only—that a given cloud-provider is a customer of a CDN for delivery and the cloud-provider has many cloud-customers who use its services and by extension those of the CDN, similar to the first example given in the Introduction. Assume further that a given cloud-customer's site can be accessed via the following hostname:

cloud-customer.cloud-provider.com (This is merely an example. The cloud-customer's hostname could equally well be the name 'www.cloud-customer.com' which is aliased, e.g., via CNAME, to the 'cloud-provider.com' domain, but the hostname above provides a suitable example for illustrative purposes.)

Assume further that a user operating a client device 308 seeks content at that hostname. The client device 308, running a client application such as a browser, initiates a DNS lookup on the hostname cloud-customer.site.cloud-provider.com, which is aliased (e.g., CNAME) to a CDN domain, and thus through a CDN name service the client device 308 given the address of a particular CDN server 302. This can all be done in the manner described previously and in U.S. Pat. No. 6,108,703, incorporated herein by reference.

The client device 308 sends a content request (e.g., an HTTP 'Get') to the CDN server 302 with a hostname header of cloud-customer.cloud-provider.com. The CDN server 302 locates and binds the request to a metadata configuration file(s) 302a that it has for the cloud-provider.com domain. This may be done, for example, by the CDN server 302 executing a DNS lookup and examining the CNAME chain to determine the CDN customer and customer identifier to use, for example as described in U.S. patent application Ser. No. 13/666,068, filed Nov. 1, 2012 and titled "Multi-domain configuration handling in an edge network server" (now published as 2013/0191499), the teachings of which are hereby incorporated by reference in their entirety.

The metadata configuration file 302a, which in one embodiment is an XML file, can contain certain (invariant) functions and possibly certain parameters used by those functions, as known in the art and described in U.S. Pat. No. 7,240,100, and it may be periodically be distributed and updated at the CDN server 302 as described therein (prior to being needed for client requests). However, the metadata configuration file 302a (sometimes referred to as 'static' or 'invariant' control data) can also contain references to dynamic, late-bound parameters for use in the metadata functions. These parameters are preferably obtained by the CDN server 302 when needed to parse and execute the metadata configuration file 302a (e.g., at the time of the client request). It should be noted that the approach is not limited to injected parameter values for use in defined functions. In some cases, the injected information can represent certain metadata functions or logic. For convenience of description, all such kinds of dynamic information will be generally referred to herein as dynamic control information 302b. The dynamic control information 302b represents a layer of abstraction within the metadata configuration file 302a.

By way of illustration, consider a metadata function in the configuration file 302a that checks the HTTP referrer header of an incoming request against a white-list of permitted referrers. The function might be a regular expression match run (by the CDN server 302) on the referrer header against the whitelist, e.g., expressed in XML. Rather than hard-coding the whitelist into the metadata configuration file 302a, the whitelist is declared as a parameter whose value(s) must be retrieved by the CDN server to evaluate the function. This is but one example of the concept.

As noted above, the CDN server 302 is responsible for obtaining the required late-bound dynamic control information 302b from a remote host 304. In one embodiment, before processing the request, the CDN server 302 invokes an intermediate processing routine that parses the metadata configuration file 302a, determines the data dependencies, and obtains and injects the necessary dynamic control information 302b to fulfill these dependencies in the metadata configuration file 302a.

As shown in FIG. 3, in one embodiment, the CDN server 302 makes a call, e.g., a service provider interface (SPI) call, to a remote host 304 to obtain the requisite dynamic control information 302b. As those skilled in the art will recognize, the SPI means that the CDN as the calling party will define the interface specifics, in this embodiment. Thus, in this implementation the remote host 304 may be any system compliant with the SPI, e.g., a system run by the CDN, system run by the CDN customer (the cloud-provider), or even a system run by the cloud-provider's customers (the cloud-customers). In the illustrated embodiment, the remote host 304 is a CDN-operated system in a highly-available platform such as managed network storage facility (aka NetStorage) or otherwise, storing a database 400. The database 400 has the dynamic control information 302b. The CDN may provide a web-enabled portal 306a or other user interface through which, for example, a particular cloud-provider and/or cloud provider's cloud-customer can configure or update the database. Alternatively, the cloud-provider may have its own infrastructure 306b storing its control information which is periodically communicated through an appropriate applications programming interface (API) to the CDN's remote host 304.

Content Realms

Preferably the system 300 utilizes the concept of a 'content realm' to manage the retrieval and use of dynamic control information 302b. The 'content realm' defines the context for which the dynamic control information 302b is being retrieved. Hence, a given CDN customer may be associated with many different defined content realms. If the CDN customer is a cloud-provider, for example, a content realm might be defined for each of the cloud-provider's cloud-customers. For a CDN customer that uses the functionality defined herein to manage several different websites or other digital properties, the content realm might correspond to each site, etc. A content realm could also be associated with a particular area of a site, or with a particular category of products displayed on a given site, and the like.

Figure 4:
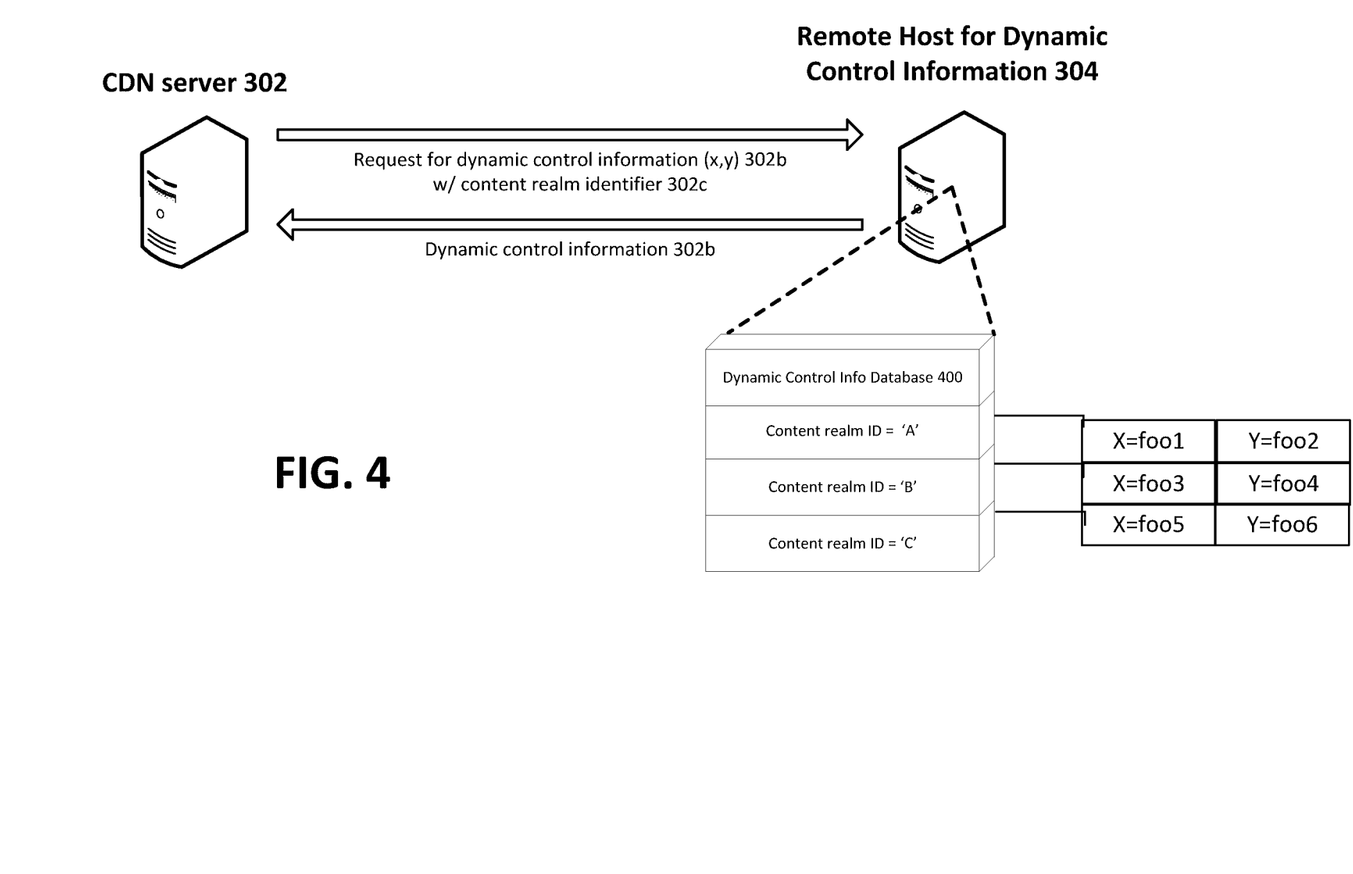
FIG. 4 is a schematic diagram illustrating one embodiment of an architecture for communicating metadata control information.

Preferably, the CDN customer defines the scope and meaning of the content realm. Then, during the processing of a content request from a client device 308, the CDN server 302 determines the content realm identifier (ID) 302c and passes it via the SPI to the remote host 304, which uses the content realm ID to return the appropriate corresponding set of dynamic control information. In this way, assuming the content realm ID corresponds to a cloud-provider's cloud-customer, the dynamic control information 302b for the appropriate cloud-customer is retrieved and injected into the metadata configuration file 302a. FIG. 4 illustrates this process. In FIG. 4, the CDN server 302 makes an SPI request for dynamic control information 302b consisting of two parameters x, y and sends a content realm ID 302c with value A, B or C. Assume that the content realm ID 302c corresponds to a particular cloud-customer. In the database 400, the value of x,y depends on the content realm ID since different cloud-customers may need or desire different content handling features. The remote host 304 looks up the values based on the content realm ID 302c and returns them to the server 302 for binding to the variables that were declared in the metadata configuration file 302a.

The CDN server 302 can determine the content realm identifier 302c in a variety of ways. As mentioned, preferably the CDN customer defines the desired content realm 302c, and logic for determining the content realm ID 302c may be included in the control file 302a. The specific logic to determine the identifier 302c will be dependent on what it signifies. Preferably the CDN server 302 extracts the content realm ID 302c from some aspect of the content request transaction/message exchange that occurs between itself and the client device 308. For example, if the identifier 302c represents a cloud-provider's cloud-customer, the server 302 might extract a content realm identifier 302c from the host header of the request (e.g., the subdomain "cloud-customer" from "cloud-customer.cloud-provider.com"). The identifier also might come from an intermediate hostname or portion thereof in an DNS aliasing (e.g., CNAMING) chain that the CDN server 302 obtains by performing a DNS lookup on the host header hostname (for example as described in U.S. patent application Ser. No. 13/666,068, filed Nov. 1, 2012 and titled "Multi-domain configuration handling in an edge network server", now published as U.S. Patent Publication No. 2013/0191499, the contents of which are hereby incorporated by reference). Alternatively, the CDN server 302 might extract the identifier 302c from the requested universal resource identifier (URI) pathname or other URI component, or from some other HTTP request header. (Note that the term URI used herein includes universal resource locators or URLs.) Hence, the content realm ID might correspond to a product identifier in the URI pathname (e.g., objects under/pathfoo/products1/* being identified as a different content realm, and thus controlled by different dynamic control information, than objects under/pathfoo/products2/*). The content realm ID 302c might be derived from the user agent, such that a client Windows machine matches to a different content realm, and thus warrants different dynamic control information 302b, than a client machine running another operating system, for example.

Figure 5:
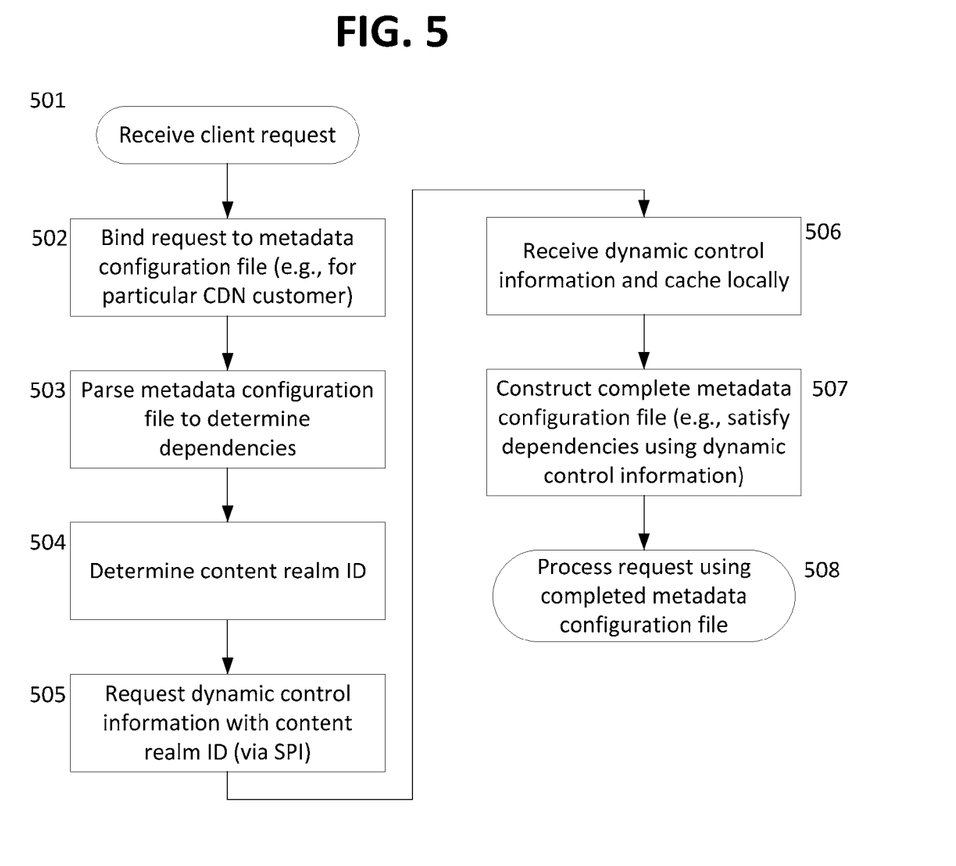
FIG. 5 is a diagram illustrating one embodiment of a logical flow within a CDN server.

FIG. 5 illustrates, in one embodiment and at a high level, the logical flow within a CDN server 302 to effect the late-binding of control information as described above. In FIG. 5, at step 501 the CDN server 302 receives the client request. At 502, the CDN server binds the request to a metadata configuration file (e.g., based on the host header, which is associated with a particular CDN customer, as previously described with reference to U.S. Pat. No. 7,240,100 and/or US Patent Publication No. 2013/0191499). At 503, the CDN server 302 parses the metadata configuration file 302a to determine dependencies on dynamic control information, and at 504 determines the content realm ID. At 505 and 506, the CDN server 302 requests the needed dynamic control information from the remote host 304 using the content realm ID and receives back the dynamic control information, caching it locally for future use. At 507, the CDN server 302 constructs the complete metadata configuration file and then (508) processes the client request in accordance therewith.

Caching

Fetched dynamic control information 302b is preferably cached locally at the CDN server 302 after it is received from the remote host 304. Thus, in one embodiment, the CDN server 302 will pull needed dynamic control information 302b from the remote host 304 the first time that a client request necessitates it. For example, the information 302b needed to respond to a request for a particular HTML file will be retrieved and cached (note that the control information needed to handle requests for embedded objects in the HTML file, and/or for other likely-to-be-requested HTML files, might be pre-fetched at the same time). For subsequent requests by the same or another client device 308, the CDN server 302 can use the locally cached information. The local cache entries can be associated with a time-to-live (TTL) so that the CDN server 302 periodically refreshes dynamic control information 302b.

Local caching does not require storing dynamic control information 302b for all objects or for all parties served by the CDN. Rather, the CDN server 302 preferably retrieves only the dynamic control information 302b necessary to respond to the particular client content requests that it is receiving, caching the data 302b as space permits and evacuating old entries the cache with a least-recently-used or other cache-management algorithm. The CDN server 302 is typically one of many in the CDN and typically sees some portion of the overall traffic. This means that mapping and load-balancing algorithms implemented with the CDN, which spread client content request load amongst various CDN servers 302 in the platform, will concomitantly result in spreading the 'load' of requesting and storing dynamic control information 302b, and provide a scalable solution for the metadata control infrastructure. Put another way, in a preferred embodiment, the load for dynamic control information 302b will follow load for client content requests.

For example, U.S. Pat. No. 6,108,703 describes in one embodiment a method for intelligently routing and replicating content over a large network of distributed servers. The teachings of U.S. Pat. No. 6,108,703 are hereby incorporated by reference in their entirety.

The foregoing is by way of example only. Any mapping, traffic-shaping, load-balancing or similar policy in the network can be leveraged. Further, it should be noted that it is possible to impose a policy for the dynamic control information 302b that differs from the policies in place for the client content requests (e.g., it may be desirable in certain situations to push or pre-populate dynamic control information 302b to certain regions of CDN servers in a way that is not related to how objects are distributed).

Purge Example

In one embodiment, the system 300 can be used to purge "on-demand" objects cached in the CDN servers. Purging objects involves invalidating them (e.g., marking their TTL as 'expired') so that they are not served from the CDN server's cache in response to client requests but instead are retrieved from the origin/source server, thus refreshing the cache.

For example, for a given content request for a particular object, the CDN server 302 can execute an 'invalidate' function defined in the associated metadata configuration file 302a. The function can determine whether the requested content should be purged and depends on a late-bound parameter from the remote host 304. In this way the purge function can be, at least in one embodiment, accomplished selectively and quickly, as it will take effect once the database on the remote host 304 is updated.

In one implementation, a function in the metadata configuration file 302a takes as a parameter an identifier for an object or set of objects (e.g., the identifier may be a URI pointing to a specific object or a path with wildcard/path-foo/* covering objects in that path) and sets the TTL of the identified object(s) to be 'expired.' The late-bound parameter is pulled from the remote host 304. The remote host 304 responds with the particular URI, causing the function to set the objects cached under the particular returned URI to 'expired.' This technique can be used to purge not only the requested object but other objects at the same time.

In another implementation, the function in the metadata configuration file 302a expects a Boolean true/false and sets the TTL of the requested object to 'expired' (or not) depending on the answer. The CDN server 302 sends a content realm ID 302c to the remote host 304 comprising an object URI or other identifier. The remote host 304 looks the object URI (or other identifier) up among URIs (or other identifiers) that have been designated in the database 400 for purging, and returns 'true' if a match is found.

These are just two of a variety of possible implementations and are provided merely for illustrative purposes.

Logging of SPI Traffic

Referring to FIG. 3, in one embodiment, the traffic for dynamic control information 302b that flows between the CDN server(s) 302 and the remote host 304 can be logged, measured and used for billing purposes. Hence, the more complex the configuration for a particular customer's websites and other digital properties, the more they might be charged.

Multi-Dimensional Control & Evaluative Logic at Remote Host

In an alternate embodiment, the dynamic control information 302b at the remote server 304 is embodied in a content policy document with embedded logic that enables the remote host 304 to return, for a given content realm ID 302c, different answers that depend on other data that the CDN server 302 sends with the SPI request. This additional layer adds a further dimension of control to the infrastructure.

Figure 6:
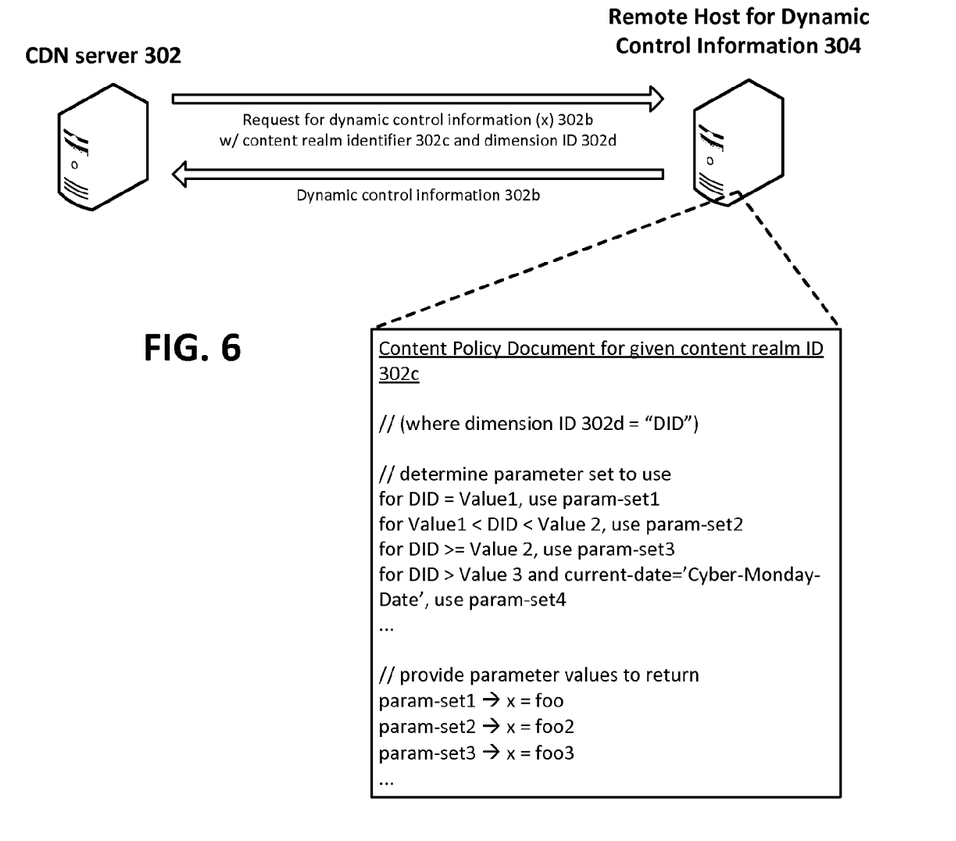
FIG. 6 is a diagram illustrating an embodiment of system in which the remote host evaluates logic in a content policy document to determine control information to return; and, FIG. 7 is a block diagram illustrating hardware in a computer system that may be used to implement the teachings hereof.

FIG. 6 illustrates an example. Assume that, as a result of a client content request (e.g., as shown in FIG. 3), the CDN server 302 makes an SPI request for dynamic control information 302b (a single parameter 'x', in this example) and sends a content realm ID 302c, as well as other data (referred to in this example and in FIG. 6 as a 'dimension ID' 302d). Though the dimension ID 302d could represent any piece of information, it is often something that is derived from the content request or some circumstance existing at the time of the request. The content policy document contains a logical layer that matches the given dimension ID 302d to a bucket/category and then returns the corresponding dynamic control information 302b for that category. As those skilled in the art will recognize, sets of multiple parameters could be determined and returned in this way.

In one use case, the dimension ID 302d could be a geographical identifier or country name derived from the client IP address by the CDN server 302. Then, the category could represent a geographical region, allowing a website owner to configure the site to respond differently for different regions, based essentially on data injected into the flow at the CDN server 302. Similarly, the CDN server 302 might inject data about the requesting client device (e.g., its browser, screen size, support for certain software, support for touchscreen, whether it is a mobile device, etc.) as the dimension ID 302d, which the CDN server 302 can determine based on the user agent or other header in the client's content request. The dimension ID might also be representative of the client's connectivity (e.g., broadband, mobile, etc.) as measured by the CDN server 302 or as otherwise determined.

As shown in FIG. 6, a variety of logic and functionality can be included in the policy document. This logic is evaluated by the remote host, taking the inputted data (the dimension ID(s) and returning control information 302(b).

More than one dimension ID 302d is possible, resulting in a rich set of configuration options.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
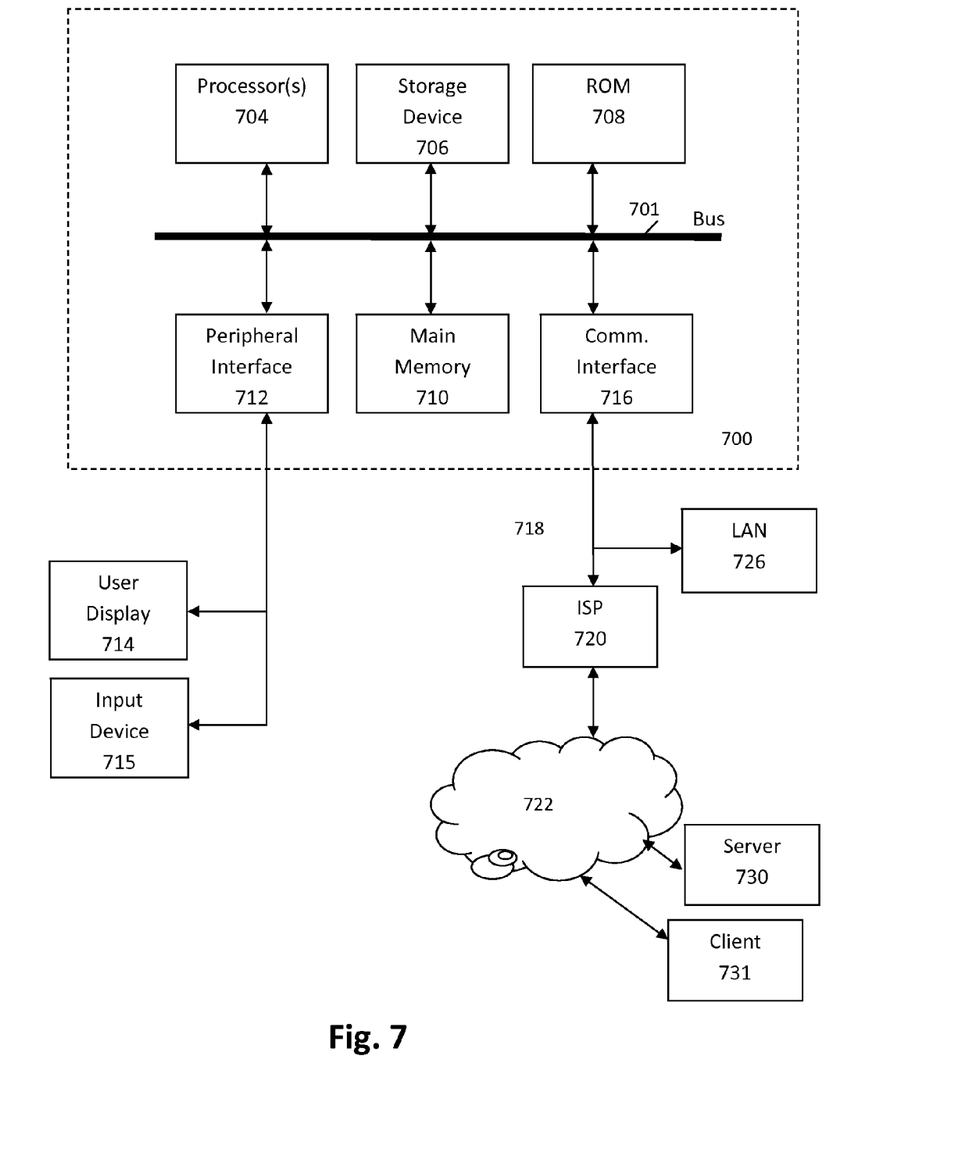

FIG. 7 is a block diagram that illustrates hardware in a computer system 700 on which embodiments of the invention may be implemented. The computer system 700 may be embodied in a client device, server, personal computer, workstation, tablet computer, wireless device, mobile device, network device, router, hub, gateway, or other device.

Computer system 700 includes a processor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

Although the computer system 700 is often managed remotely via a communication interface 716, for local administration purposes the system 700 may have a peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry and logic for local buses such as Universal Serial Bus (USB) or other communication links.

Computer system 700 is coupled to a communication interface 716 that provides a link between the system bus 701 and an external communication link. The communication interface 716 provides a network link 718. The communication interface 716 may represent an Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executable code may also be read from network link 718 (e.g., following storage in an interface buffer, local memory, or other circuitry).

The invention claimed is:

1. A system comprising:
   a content delivery network (CDN) server that has circuitry forming one or more processors and memory holding non-transitory computer-program instructions to be executed by the one or more processors to cause the CDN server to:
   receive a first request for particular content from a client, the request including a host header associated with a given content provider;
   in response to the first request, determine a configuration file stored at the CDN server to apply for handling the first request, the configuration file being associated with any of: the given content provider and a service provider to the given content provider that is distinct from the content delivery network service provider, wherein the determination is based at least in part on a string in the host header;
   identify, within the configuration file, a content control that indicates how to handle the first request from within a set of content controls stored at the CDN server in the configuration file, the content control comprising a function that relies on a variable;
   determine that the content control has at least one dependency, wherein the dependency comprises a reference to particular control information that sets the value of the variable;
   extract an identifier from the first request, the extracted identifier comprising any of (i) at least part of a URI, (ii) at least part of a hostname, and (iii) at least part of a request header field;
   in response to the identification of the content control with the at least one dependency, send a second request that includes the extracted identifier to a remote host for the particular control information, so as to satisfy the dependency;
   receive the particular control information from the remote host, the particular control information comprising a value for the variable;
   satisfy the at least one dependency with the particular control information;
   apply the content control to determine how to handle the first request, said application of the content control comprising using the value given by the particular control information for the variable, said application occurring prior to serving a response to the first request;
   the remote host having circuitry forming one or more processors coupled to memory holding non-transitory computer-program instructions to be executed by the one or more processors to cause the remote host to:
   receive the second request for the particular control information;
   select the value from amongst a plurality of stored values for the variable, based at least in part on the extracted identifier sent with the second request; and,
   send the value to the CDN server, in response to the second request.

2. The apparatus of claim 1, wherein the executed non-transitory computer-program instructions further will cause the CDN server to: cache the particular control information at the CDN server for use with subsequent requests for the particular content.

3. The apparatus of claim 1, wherein the CDN operates the CDN server as a service for a cloud-provider that provides at least one of: infrastructure as a service, platform as a service, software as a service, and wherein the extracted identifier corresponds to a given cloud-customer of the cloud-provider.

4. The apparatus of claim 1, wherein the content control with the at least one dependency determines whether the particular content is valid to serve to the client from a cache at the CDN server.

5. The apparatus of claim 1, wherein the configuration file comprises a markup language configuration file.

6. A method implemented with a content delivery network (CDN) server, and a remote host, the method comprising:

A. with the CDN server, receiving a first request for particular content from a client, the request including a host header associated with a given content provider;

in response to the first request, determining a configuration file stored at the CDN server to apply for handling the first request, the configuration file being associated with any of: the given content provider and a service provider to the given content provider that is distinct from the content delivery network service provider, wherein said determining is based at least in part on a string in the host header;

identifying, within the configuration file, a content control that indicates how to handle the first request from within a set of content controls stored at the CDN server in the configuration file, the content control comprising a function that relies on a variable;

determining that the content control has at least one dependency;

in response to the determination that the content control has the at least one dependency, wherein the dependency comprises a reference to particular control information that sets the value of the variable;

extract an identifier from the first request, the extracted identifier comprising any of (i) at least part of a URI, (ii) at least part of a hostname, and (iii) at least part of a request header field;

in response to the identification of the content control with the at least one dependency, send a second request that includes the extracted identifier to a remote host for the particular control information, so as to satisfy the dependency;

receiving the particular control information from the remote host, the particular control information comprising a value for the variable;

satisfying the at least one dependency with the particular control information;

applying the content control to determine how to handle the first request, said application of the content control comprising using the value given by the particular control information for the variable, said application occurring prior to serving a response to the first request;

B. with the remote host:

receiving the second request for the particular control information;

selecting the value policy from amongst a plurality of stored values for the variable, based at least in part on the extracted identifier sent with the second request; and, sending the value to the CDN server, in response to the second request.

7. The method of claim 6, further comprising caching the particular control information at the CDN server for use with subsequent requests for the particular content.

8. The method of claim 6, wherein the extracted identifier corresponds to a given cloud-customer of the cloud-provider, the cloud-provider being a customer of the CDN and providing a service that is at least one of: infrastructure as a service, platform as a service, software as a service.

9. The method of claim 6, wherein the content control with the at least one dependency determines whether the particular content is valid to serve to the client from a cache at the CDN server.

10. The method of claim 6, wherein the configuration file comprises a markup language configuration file.

11. The system of claim 1, the executed instructions further causing the CDN server to: after applying the content control and determining how to handle the first request, send a third request to an origin server for the particular content that was requested by the client device.

12. The method of claim 6, further comprising the CDN server, after applying the content control and determining how to handle the first request, sending a third request to an origin server for the particular content that was requested by the client device.

13. The system of claim 1, wherein the first request comprises an HTTP request.

14. The method of claim 6, wherein the first request comprises an HTTP request.

* * * * *